(12) United States Patent
Fruehling et al.

(10) Patent No.: US 11,063,701 B2
(45) Date of Patent: Jul. 13, 2021

(54) SAFETY INTEGRITY LEVEL OF SERVICE (SILOS) SYSTEM

(71) Applicant: Encore Semi, Inc., San Diego, CA (US)

(72) Inventors: Terry Lee Fruehling, Hartford, WI (US); Le Trong Nguyen, Saratoga, CA (US)

(73) Assignee: Encore Semi, Inc., San Diego, CA (US)

( * ) Notice: Subject to any disclaimer, the term of this patent is extended or adjusted under 35 U.S.C. 154(b) by 0 days.

(21) Appl. No.: 16/506,539

(22) Filed: Jul. 9, 2019

(65) Prior Publication Data

US 2020/0021397 A1 Jan. 16, 2020

Related U.S. Application Data

(60) Provisional application No. 62/697,638, filed on Jul. 13, 2018.

(51) Int. Cl.
| | |
|---|---|
| *H04L 1/00* | (2006.01) |
| *H04L 12/801* | (2013.01) |
| *H04L 12/24* | (2006.01) |
| *H04L 29/08* | (2006.01) |
| *H04L 12/933* | (2013.01) |

(52) U.S. Cl.
CPC .......... *H04L 1/0082* (2013.01); *H04L 1/0083* (2013.01); *H04L 41/0631* (2013.01); *H04L 47/34* (2013.01); *H04L 49/109* (2013.01); *H04L 69/324* (2013.01)

(58) Field of Classification Search
CPC ..... H04L 1/0082; H04L 1/0083; H04L 47/34; H04L 41/0631; H04L 69/324; H04L 49/109; H04L 41/16; H04L 41/147; H04L 41/5009
See application file for complete search history.

(56) References Cited

U.S. PATENT DOCUMENTS

| | | | |
|---|---|---|---|
| 2004/0064537 A1* | 4/2004 | Anderson | H04L 63/12 709/223 |
| 2008/0077794 A1* | 3/2008 | Arnold | H04L 9/0822 713/169 |
| 2014/0044265 A1* | 2/2014 | Kocher | H04L 9/3247 380/277 |
| 2015/0319614 A1* | 11/2015 | Cho | H04W 12/1008 726/7 |
| 2017/0093910 A1* | 3/2017 | Gukal | H04L 63/1425 |

(Continued)

*Primary Examiner* — Ivan O Latorre
(74) *Attorney, Agent, or Firm* — Procopio, Cory, Hargreaves & Savitch LLP (57) ABSTRACT

Systems and methods for monitoring, characterizing and managing communications between and amongst data packet sources are provided, for example by providing Safety Integrity Level of Services (SILoS) for of System-On-Chip (SOC) and/or Network-on-Chip (NOC) deployments. For example, disclosed herein is a controller, that in combination with digital logic circuitry, is configured to receive data packets transmitted between intellectual property blocks of a SOC or NOC deployment for assuring correct sequencing, monitor received signals to detect or predict faults therein, and generate an indication signal indicative of the fault. The indication signal used by a performance analysis system executing software for diagnostic, prognostic analysis.

11 Claims, 7 Drawing Sheets

(56) References Cited

U.S. PATENT DOCUMENTS

| | | | |
|---|---|---|---|
| 2018/0006829 A1* | 1/2018 | Kravitz | H04W 12/06 |
| 2019/0044728 A1* | 2/2019 | Karmoose | H04L 9/14 |
| 2021/0058396 A1* | 2/2021 | Nathanson | H04W 12/069 |

* cited by examiner

SAFETY INTEGRITY LEVEL OF SERVICE (SILOS) SYSTEM

CROSS-REFERENCE TO RELATED APPLICATIONS

This application claims the benefit of U.S. Patent Application No. 62/697,638, filed on Jul. 13, 2018, the disclosure of which is incorporated herein in its entirety by reference.

TECHNICAL FIELD

The embodiments described herein are related to safety integrity of System-On-Chip and/or Network-on-Chip deployments, and in particular to systems, devices, and methods for providing safety integrity level of services for System-On-Chip and/or Network-on-Chip deployments.

BACKGROUND

Current System-On-Chip (SOC) deployments are commonly represented by extreme levels of complex intellectual property (IP) modules integrations. Further, conventional SOC implementations are connected via a host of multiple Network-On-Chip (NOC) communication buses, configurations, ancillary network support components and associated protocols. The complexity of these systems and subsystems (both in hardware & software) becomes sources of random, systematic operational failures. Ensuring SOC communication integrity, in the presence of a multitude of concurrent operational scenarios, is a daunting task for current safety mechanisms which generally are insufficient, difficult to validate, inconsistently applied, or possibly not present.

Current implementations of Quality of Service (QoS) and Network Coherent Interconnect (NCI) systems were not developed to intentionally support concepts associated with system safety integrity level (SIL) applications. Further, the supporting safety analysis, verification/validation methods are tedious, complex and quite possibly inaccurate and/or incomplete when applied to present state-of-the-art systems (for both Hardware and Software architectures and implementations). The inherent coverage capabilities of present safety mechanisms are inconclusive. The required analysis in the presence of a multitude of possible random failure(s) along with infinite levels of interconnect (IC) complexity is presently both speculative and non-deterministic.

The SOC IP integration is such that simulation, or formal methods of system verification, can require months of expensive computational time. Should element models be incorrect, safety fault libraries be incomplete or proper observation points not available, then analytical results must also be considered as suspect.

Therefore, what is needed are an apparatus and method that overcome these significant problems found in the aforementioned conventional approach to SILoS integration and design.

SUMMARY

Apparatuses and methods for monitoring, characterizing and managing communications between and amongst data packet sources are provided. In another aspect, alone or in combination, apparatus and methods for providing Safety Integrity Level of Services (SILoS) is provided.

A system integrity level of service (SILoS) system for monitoring communications between intellectual property (IP) blocks is disclosed herein. The system comprises a communication channel communicatively coupled between a first intellectual property block and a second intellectual property block for transmission of data between the first and second intellectual property blocks; a first controller communicatively coupled between the first intellectual property block and the communication channel; and a second controller communicatively coupled between the second intellectual property block and the communication channel. The first controller comprises a first decoder configured to receive a first data packet from the first IP block, the first data packet comprising a first payload for the second IP block, a first digital logic circuit configured to generate a first digital signature associated with the first data packet and build a first controller data packet comprising the first digital signature as a payload of the first controller data packet, and a first transmitter configured to transmit the first controller data packet. The second controller comprises a second decoder configured to receive the first controller data packet from the first controller and configured to decode the first digital signature from the payload of the first controller data packet; and a second digital circuit configured to evaluate the first digital signature against a register of digital signatures to determine if the first digital signature is correctly received and associate a status of the first data packet received by the second IP block from the first IP block based on the determination of the first digital signature.

In another aspect, a device for providing safety integrity level of service (SILoS) system is disclosed herein. The device comprises a digital logic circuit configured to receive at least one signal of a plurality of signals and decompose the at least one signal into a plurality of parts; at least on memory configured to store the decomposed signal and store instructions to detect deviations from an expected signal and the decomposed signal; and a controller comprising a memory coupled to a processor, the controller coupled to the digital logic circuit. The controller configured by the instructions to analyze the decomposed signal to detect deviations from an expected signal; monitor a plurality of signals including the at least one signal to detect or predict a fault based in part on the detected deviation, and generate an indication signal associated with the plurality of signals, the indication signal comprising at least one of a fault indicator and a message indicative of a fault.

In another aspect, a device for providing safety integrity level of service (SILoS) system is disclosed herein. The device comprises a digital logic circuit configured to receive a signal and analyze the signal to detect deviations from an expected signal and a controller comprising a memory coupled to a processor, the controller coupled to the digital logic circuit. The controller configured to monitor the signal to detect a fault based in part on the detected deviation, and generate an indication signal associated with the signal, the indication signal comprising a fault indicator.

Other features and advantages of the present inventive concept should be apparent from the following description which illustrates by way of example aspects of the present inventive concept.

BRIEF DESCRIPTION OF THE DRAWINGS

The above and other aspects and features of the present inventive concept will be more apparent by describing example embodiments with reference to the accompanying drawings, in which.

DETAILED DESCRIPTION

While certain embodiments are described, these embodiments are presented by way of example only, and are not intended to limit the scope of protection. The methods and systems described herein may be embodied in a variety of other forms. For example, certain additional advantages, implementations, examples, and embodiments are explained in additional detail in Attachments 1, 2, 3, and 4, attached hereto and the contents of which are each incorporated herein by reference in their entirety. Attachment 1 provides embodiments of a SILoS system and non-limiting benefits and advantages, in accordance with any embodiment of the SILoS system described herein. Attachment 2 describes an example SILoS system and non-limiting description of benefits and advantages, in accordance with any embodiment of the SILoS system described herein. Attachment 3 describes an embodiment of a SILoS system and non-limiting benefits and advantages, in accordance with any embodiment of the SILoS system described herein. Attachment 4 describes an example SILoS system and example processes for implementing the SILoS system in an SOC, in accordance with any embodiment of the SILoS system described herein. The embodiments described herein may be implemented alone or in combination with one or more of the embodiments described in the Attachments. Furthermore, various omissions, substitutions, and changes in the form of the example methods and systems described herein may be made without departing from the scope of protection.

Embodiments herein described apparatus and methods provided to overcome the significant problems found in the aforementioned conventional approach to SILoS integration and design as described above. Embodiments herein provide a safety integrity level (SIL) assurance through monitoring communicated data packets for performance characterization and anomaly prediction of the data packets communicated between sources, for example, by analyzing performance, node to node volume flow, bandwidth consumption of each node, and total communication bandwidth consumed compared against total channel bandwidth. In various embodiments the data packets sources may be intellectual property (IP) cores or IP blocks of, for example, system on a chip (SOC) and/or application specific integrated circuit (ASIC) chips. Embodiments herein may be configured to provide an independent predictive monitoring and diagnostic coverage that can be integrated into current systems thereby augmenting conventional methods. In some embodiments, the systems described herein may be implemented as a standalone device. For example, in some embodiments, the systems describes herein may be implemented on an engine control unit (ECU) level usable to probe IP blocks of a chip to perform the functions described herein. Some non-limiting advantages are that embodiments described herein can be configured to provide global fault reaction safety mechanism to the present services. This can enhance confidence that an integrated system is either operating as intended or in a prescribed safe state. Further details are provided in Attachments 1-4.

Embodiments herein may provide for a system safety performance analyzer on a chip (sometimes referred to herein as SILoS or generally system). The analyzer may be configured to perform a host of performance diagnostics and predictive analysis of a system IP as described herein and in the Attachments 1-4. The analyzer may be connected to a SOC or Network on Chip (NOC) Input output ports, in some embodiments, which operate as observation points for the analyzer to monitor the state of health of the SOC or NOC.

FIGS. 1A-1D are examples of a SILoS implementation integrated into a variety of different systems. FIGS. 1A-1D illustrate example systems 200A-D (collectively referred to herein as systems 200) that may be implemented as SOC and/or ASIC or on the ECU level. Other systems may be equally applicable as described in detail in Attachments 1-4. In some embodiments, the systems 200A-D comprises a plurality of nodes or IP blocks that may be used for performing safety applications or analyzing performance of a chip of systems 200A-D designed to meet certain safety and integrity standards to ensure safe and consistent operation. Further details and systems that may be equally applicable as described in detail in Attachments 1-4.

Under conventional operating procedures, data packets can be transmitted between the various blocks and nodes of the systems 200 (e.g., along a point-to-point communication channel or through a mesh network, crossbar network, or the like), each data packet includes a payload to be decoded by a receiving block for performing operations. For example, a first block may generate a payload including a command intended for a second block. In this example, the first block may also be referred to as a master block and the second a slave block, as the slave block is being instructed by the master block. The slave block receives and decodes the data packet to identify the command in the payload and generates a response packet to be transmitted to the master block, or transmitted downstream to a subsequent block based on the payload and/or a data transferee. In another embodiment, the payload may be a request from one block for another block to perform an action.

FIGS. 1A-1D also illustrate a SILoS system or module 100 disposed at various locations (shown as red blocks for illustrative purposes only) into the existing systems 200A-D. The SILoS module shown as item 100 may be used, for example, as probe points on a SOC and/or NOC. SILoS module 100 may be scattered at various interconnects on the NOC and/or SOC to monitor or help mine data, store the data in a memory, and then execute some rudimentary preprocessing. SILoS module 100 may transmit the mined dated to processing (e.g., a microprocessor, processing device, or the like) to execute data analysis, including but not limited to, statistical data processing or AI predictive analysis. For example, the SILoS module 100 may be configured to provide SILoS by identifying faults within the system 200 at various interconnects therein. In various embodiments, the SILoS module 100 may be similar to a network performance analyzer, with the modification of being integrated onto the SOC NOC and configured to provide safety analysis of network transactions. Thus, the SILoS module may be configured to provide assurance that the required Safety Integrity Level (SIL) is achieved in the presence of possible management and/or control-related service faults, such as but not limited to, Quality of Service (QoS), class of service (CoS), type of service (ToS), etc. The example locations may be representative of various locations of SILoS modules 100 that may be used for monitoring communications between and from one or more IP blocks of system 200. While certain locations are illustrated herein, it will be appreciated that SILoS modules may be disposed at any location within the system where monitoring of communications for SILoS may beneficially be ascertained and achieved.

In some embodiments, the SILoS module 100 may be disposed (e.g., integrated with a system 200) between a first and second IP block. For example, the SILoS module 100 may be disposed at one or more input and/or output interconnections (e.g., sometimes referred to as probe points) between the first and second IP blocks within a mesh network to mine data communications therethrough. Similarly, the SILoS module 100 may be disposed at input and/or output interconnections between the first and second IP blocks along a point-to-point communication channel or multiple point-to-point communication channels. Or, the SILoS module 100 may be integrated with a single IP block for monitoring signals therein. In various embodiments, the SILoS module 100 comprises a digital logic circuit configured to receive one or more signals corresponding to data or transactions between elemental function blocks (e.g., ECU level, SOC, IP blocks) or within an IP block and analyze the signals to detect deviations from expected signals. That is, the SILoS module 100 may be configured to mine data transfers between and within IP blocks and function blocks of the SOC or NOC. For example, as compared to a comparison logic of expected signals.

It will be understood that data packets may be transmitted as part of signals transmitted within and outside of the system 200, thus the terms data packets and signals may be used interchangeable throughout this disclosure. Furthermore, in some embodiments, the SILoS module 100 need not be integrated within the system 200, and may alternatively or in combination, be attached to an external connection (e.g., a port) of the system 200 to monitor data packets that are received by and/or transmitted from the system 200 to external systems in safety applications.

In some embodiments, signals communicated through a mesh network, crossbar network or the like or similarly along point-to-point communication channel(s) between IP blocks or within a single IP block may be intercepted, received, etc. by a respective SILoS module 100 and/or other different SILoS modules. In some embodiments, the SILoS module 100 may forward the data packet to the intended recipient IP block. Forwarding may be referred to as passing the data packet through, rerouting, decoding and reconstructing the data packet, etc. The resulting data packet is then received by the IP block for performing operations based on the contents thereof. Example operations related to the SILoS module 100 may include, but are not limited to, tracing identified packets through the NOC and/or identifying source and destination tags. In some embodiments, the SILoS module 100 may be integrated in to existing SOC integrity devices or a standalone device that can be attached to a port of the system 200 for receiving and analyzing signals to and from the system 200 from and to external systems (not shown). For example, in some SOC devices the SILoS module 100 may be integrated into integrated circuit (IC) monitoring systems at one or more respective input/output ports. In as similar manner, the SILoS module 100 can be instantiated at the ECU level at corresponding communications ports of ICs.

The SILoS module 100 may be configured to analyze a received data packet and evaluated it for error or fault detection. For example, the SILoS module 100 may include logical connection to a controller comprising a memory coupled to a processor (e.g., as described in more detail in connection to FIG. 5) and coupled to the digital logic circuit. The controller may be configured monitor the signals to detect one or more fault based in part on a detected deviation from the expected signals. The controller may also perform data analysis of the data received and/or transmitted by the SILoS module 100, for example, by employing various artificial intelligence technologies to assist with analyzing performance. System performance analysis may be aided by artificial intelligence technologies to facilitate quantitative and statistical performance analysis, which may include predictive analysis algorithms that exploit artificial intelligence technologies. In some embodiments, artificial intelligence technologies may be used along with the performance analyzer for characterization, learning and/or prediction of the SILoS module 100 operation (as described below). An indication signal comprising a fault indicator or flag (sometimes also referred to as a SILoS fault flag) may be generated in response to detecting a fault. The indication signal may be associated with the signal corresponding to the detected fault and transmitted to an IP block that is the intended recipient of the signal. The fault indicator may be associated with the signal corresponding to the detected fault and may be received at the IP block at approximately the same time or prior to the signal corresponding to the detected fault arriving at intended IP block. In some embodiments, alone or in combination, the indication signal may comprise a message indicative of a fault, the message may be received and interpreted by a system comprising safety processing software as a fault. Thus, in some embodiments, a SILoS module 100 may be associated with one or more IP blocks, such as, for example, acting as a gateway for data packets to ensure data packets are being transmitted/received as intended and includes proper content such that the system 200 may operate within safety standards. For example, in some embodiments, a SILoS module 100 may be associated with each port between the NOC and the IP with one block per connection point. Additional details and explanation can be found in Attachments 1-4 incorporated herein as part of this disclosure.

In some embodiments, the SILoS 100 may be configured to monitor unexpected characteristics of the received data. In various embodiments, monitoring may include one or more of analyzing, learning, and predicting unexpected characteristics of the received data, for example, based on accumulating data from one or more IP blocks and/or over various communications between IP blocks. The accumulated data may be stored in a data store for use in, for example, quantitative, statistical or artificial intelligence applications as described herein. In some embodiments, firmware (as described below in connection to FIG. 5) may be employed to collect and/or accumulate the received data (e.g., network communication data) and/or to train, operate the artificial intelligence. For example, unusual or unexpected packet characteristics such as packet content or size, inconsistency in timing and/or sequencing, unexpected packet received and/or received from an unexpected IP block, etc. In some embodiments, monitoring may comprise identifying possible malware intended to disrupt the SOC operations. In some embodiments, the SILoS 100 may be configured to monitor channel utilization to determine bandwidth utilization for transmitting the signal. Such may be beneficial for identifying traffic stress on the network and improving traffic flow. These unexpected characteristics may also be representative of faults or acting malevolent software, to which the system must respond to in a safe manner. In some embodiments, the unexpected characteristics may be associated with the fault and/or corresponding signals, and stored for use in anticipating future faults based on, for example, identifying the presence of these characteristics.

In some embodiment the SILoS module 100 may build a record of a plurality faults in association with the corresponding signals for use in predictive and anticipatory fault detection analysis for detection prior to occurrence of a fault (e.g., prognostics) thereby continuing to ensure safe operation is achieved. For example, in various embodiments, the record of faults may be used in either a form of extrapolation predictive analysis, or training artificial intelligence neural networks that can perform the predictive and anticipatory fault detection analysis for detection prior to occurrence of fault thereby ensuring to ensure safe operation is achieved. In one embodiment, one or more SILoS modules 100 may be employed to accumulate communication data included in received data signals. The SILoS module 100 may use the accumulated communication data to train one or more artificial intelligence networks (e.g., a deep neural network or the like). Using the accumulated communication data, the artificial intelligence may be configured to characterize the channel over which a signal is received and predict behavior of the channel based, for example, on the accumulated data. In some implementations, alone or in combination, the artificial intelligence may also predict behavior of the communication channel. Furthermore, in either embodiment, the artificial intelligence may characterize and/or predict behavior of the IP blocks used for communicating the signals over the network. In some embodiments, the SILoS module 100 may operate similar to a network analyzer that emulates similar network timing analysis functions, for example in some embodiments, that employs precision timing measurements of packet delay and delivery similar to the IEEE-1588 v2 Precision Timing Protocol (PTP) standards.

As used herein, artificial intelligence may be used to refer to any type of machine learning processes and/or algorithms. For example, but not limited to, deep neural networks, deep belief networks recurrent neural networks, artificial neural networks, and the like. The embodiments herein may be configured to utilize a record, data base, or recording of accumulated data based on received signals to characterize events indicative of performance and safety parameters so to predict, identify and improve overall performance of the network. In some embodiments, the received data may be collected and/or accumulated by employing firmware as described herein. The firmware, in some implementations, may also be used to train, operate the artificial intelligence.

Figure 1A:
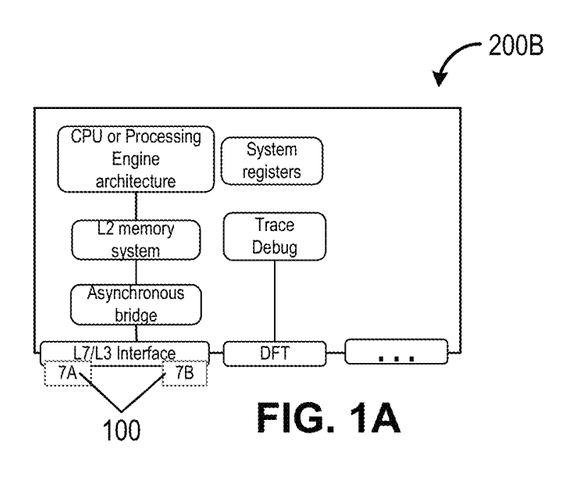
FIGS. 1A-1D are examples of a SILoS implementation integrated into an SOC.
Figure 1B:
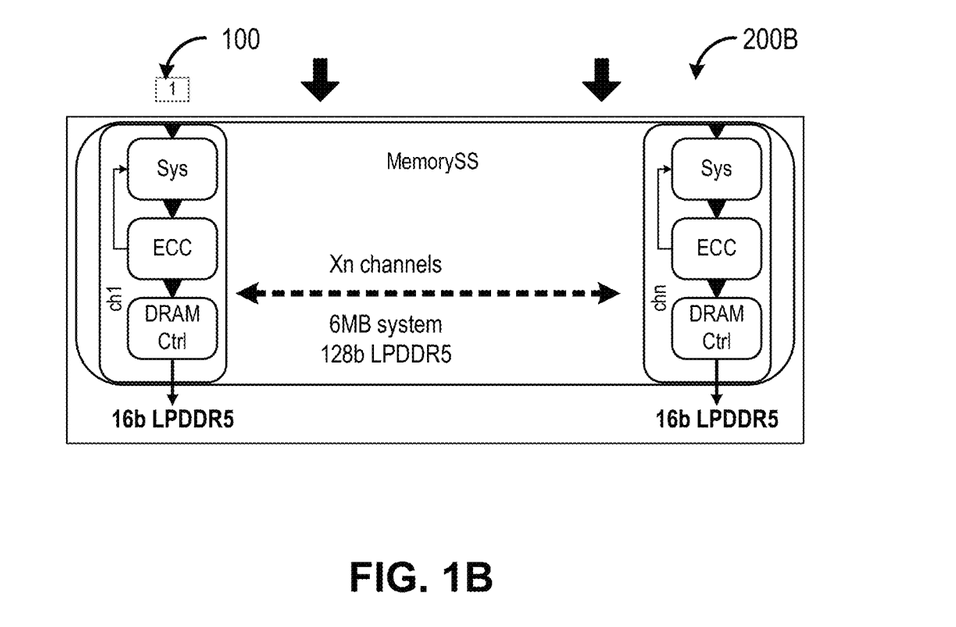
Figure 1C:
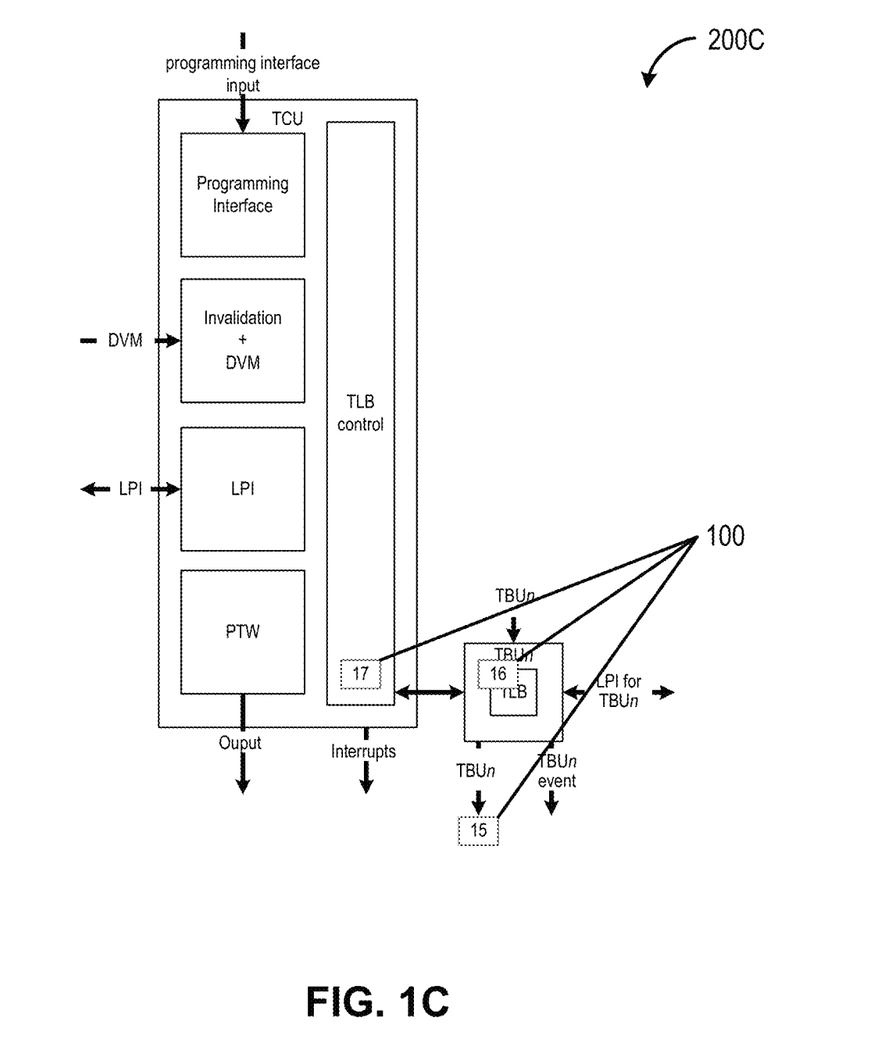
Figure 1D:
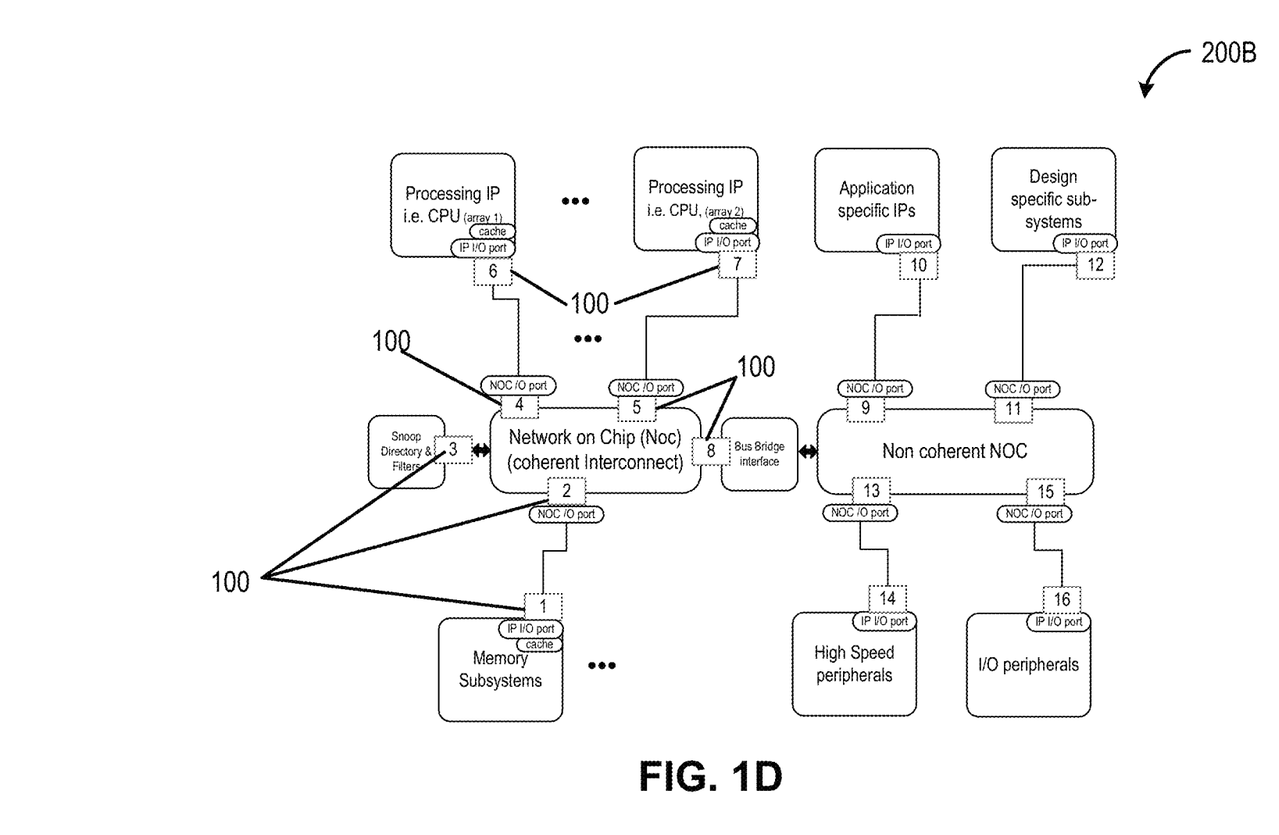
Figure 2:
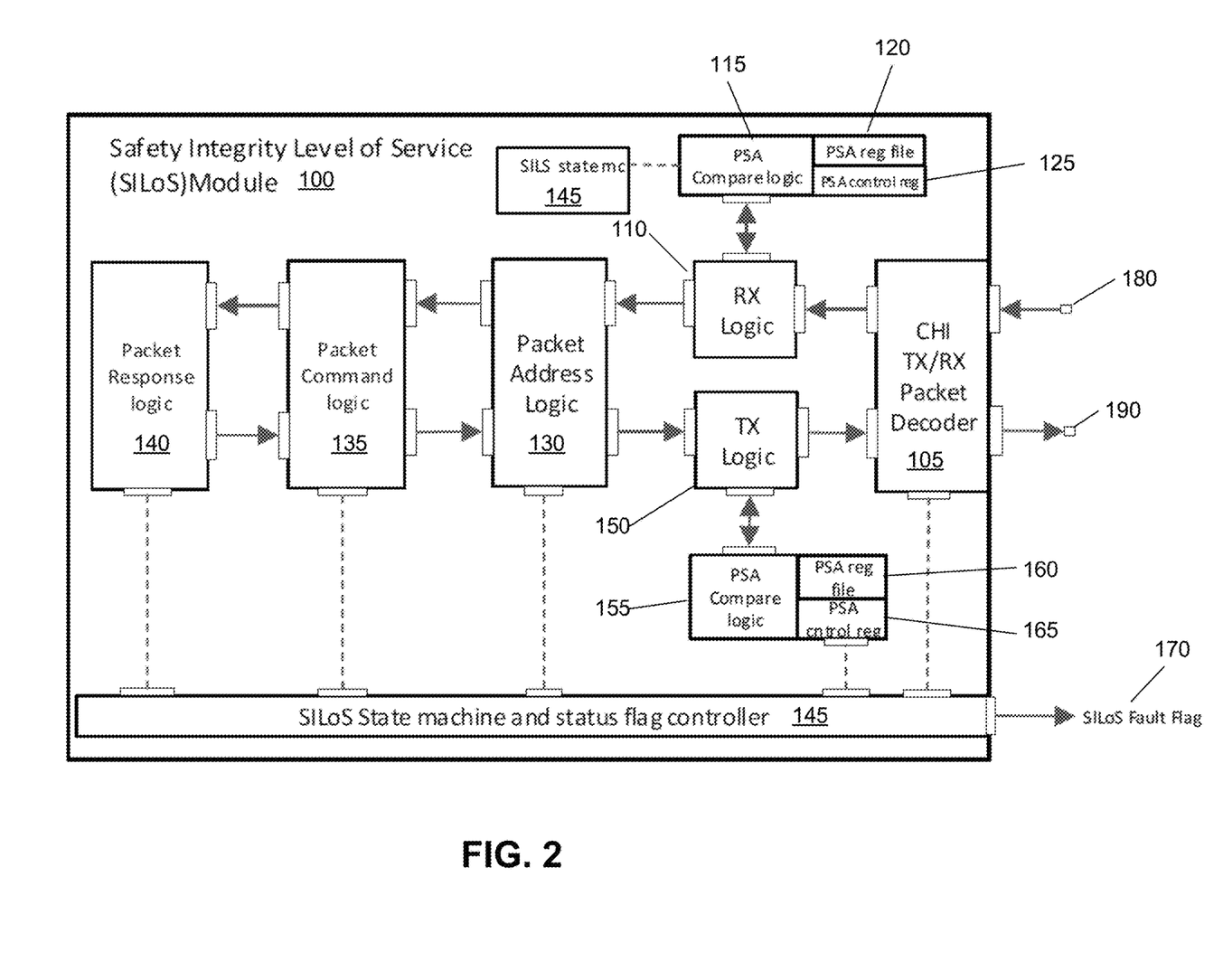
FIG. 2 is a general block diagram illustrating a possible embodiment of a generic SILoS implementation.

FIG. 2 illustrates is a general block diagram of an embodiment of a generic SILoS implementation. FIG. 1 illustrates the SILoS module 100 that may be configured to provide the services and benefits as described in Attachments 1-4. As described above, the SILoS module 100 may be configured to receive data packets 180 from, for example, a first IP block and transmit the data packet 190 to, for example, a second IP block. In some embodiments, the SILoS module 100 may receive the data packet, analyze the data packet, and forward the data packet onto the intended recipient. The SILoS module 100 may be disposed at one or more interconnects throughout a mesh network, crossbar network, or the like or similarly at interconnections along point-to-point communication channel(s) that communicatively couples a first IP block and a second IP block for transmission of data between the IP blocks. In another implementation, the SILoS module 100 may be disposed along a communication path to intercept data within a single IP block to ascertain SILoS of that single IP block and then pass the data for completing the intended action of the IP block.

In the illustrated embodiment of FIG. 2, the SILoS module 100 may include a receiving pathway and a transmission pathway (shown by the blue arrows for illustrative purposes only) each comprising a plurality of circuit blocks. For example, the SILoS 100 may include a decoder 105 configured to receive an incoming data packet 180 and encode and then transmit an analyzed data packet 190. In some embodiments, the decoder 105 receives a data packet from another SILoS module and transmits a SILoS data packet to either the same or a different SILoS module. In some embodiments, the decoder 105 may be configured to extract and decode fields of the received data packet for further processing by the SILoS module 100.

The SILoS module 100 also comprises digital logic for monitoring and analyzing the received data packet and ascertaining SILoS based the contents therein. The digital logic circuit may comprise a plurality of logic blocks including, but not limited to, receive logic 110, transmission logic 150, packet address logic 130, packet command logic 135, and packet response logic 140. Each component of the SILoS module 100 may be coupled to a SILoS controller 145. The digital logic circuit may be configured to receive a signal including one or more data packets and decompose the signal into a plurality of parts, where each part may be any component that makes up the signal. For example, payload, source and/or destination identifiers, timestamp, command and/or response indicators, etc.

Along the receiving pathway, in some embodiments, the packet address logic 130 may be configured to perform address processing of the received packet. Where the data packet is a packet from an IP block, this may include, for example, confirming the intended receiving IP block is the same as the IP block receiving the data packet and/or monitoring channel bandwidth and/or key characteristics (jitter, latency, consistency etc.) as consumed between a source IP block and a destination IP block. The actual IP block receiving the data packet may be the IP block associated with the SILoS module 100 (e.g., on to which the SILoS module 100 is coupled). This confirms that data packet is being received by the intended block. Where the data packet is a SILoS data packet, the packet address logic 130 confirms that the destination address matches the receiving SILoS module 100.

In some embodiments, the receive logic 110 may is coupled to a PSA comparison logic 115, PSA register file 120, and a PSA control registry 125. In some embodiments the receive logic 115 may be configured to perform cyclic redundancy check computations to confirm that the packet was received without any error and/or that the entire data stream has been received. The transmission logic 150 is coupled to a PSA comparison logic 155, PSA register file 160, and a PSA control registry 165. In some embodiments, PSA comparison logic 155, PSA register file 160, and a PSA control registry 165 may be the PSA comparison logic 115, PSA register file 120, and a PSA control registry 125, while in others they may be separate components.

In some embodiments, the packet command logic 135 may be configured to perform command processing of the received data packet. In some embodiments, where the data packet is received from an IP block, the processing may include identifying the type of data packet and the requested operation. For example, the header, payload or other fields of the data packet may be decoded to identify the type of packet and the payload. Types of packets may include, but are not limited to, a request packet (e.g., request for some information), a response packet (e.g., a response to a received data packet), a snoop command packet, a data packet including data for storage in the system, and/or a SILoS packet. Identification of the packets can also be categorized as type of service (e.g., a ToS as an identifier which determines how a class of data will be handled or prioritized on the network) or class of service (e.g., CoS such as video versus informational data) Where the packet is a SILoS packet, the processing may include identifying what, if any, additional action needs to be taken by the receiving IP block. In some embodiments, this information may be used subsequently by the packet response logic 140 to determine the appropriate action to be taken by the SILoS module 100.

In some embodiments, the packet response logic 140 may be configured to perform one or more SILoS response functions based on information received from the packet command logic 140.

Along the transmission pathway, in some embodiments, the operations are reversed. Where the data packet is from an IP block, the transmission pathway may be configured to forward the received data packet to the intended receiving IP block. In some embodiments, the transmission pathway may be configured to build a SILoS data packet for transmission downstream (e.g., as described below and in connection to Attachment 4).

Each component of the SILoS module 100 may be communicatively coupled to a SILoS controller 145 that may be configured to perform packet sequencing or recombination operation of the module 100. For example, in various embodiments, the SILoS controller 145 (also referred to as a SILoS state-machine) in combination with PSA comparison logic and the PSA register file 120, may be configured to collect data packets and assure the correct sequencing of the data. It can then take the data and send it to a dedicated data store or storage device (e.g., main memory 565 and/or secondary memory 570 of FIG. 5) for diagnostic, prognostic analysis by a processor (e.g., processor 560 of FIG. 5) of a computer system. In some embodiments, the SILoS controller 145 may be configured to generate a status indicator based on the received data packet. The status indicator may be transmitted to a data store (e.g., as described in connection to FIG. 5) and associated with the received data packet. In some embodiments, the status indicator may be associated with a transmitted data packet 190 and may be received by the receiving IP block at approximately the same time as the data packet or prior to the IP block receiving the data packet. In some embodiments, the status indicator may be part of a SILoS data packet as described in detail below. The status indicator may be a "normal" flag indicating normal operation and/or an "error" flag indicating that an error was detected. By monitoring the status of each received data packet, errors and faults in the operation of the SOC may be identified to monitor the system integrity level, for example, by identifying trends between received data packets. By associating identified errors with certain data packets and/or characteristics of its reception the system may be adapted to learn, predict, and/or anticipate current or future faults and errors in the SOC. Characteristics of the data packet may include, but not limited to, packet protocol, latency, jitter, sequence, data packet size, content of the data packet, received and/or transmit time-stamps, source block, intended recipient block, environmental conditions surrounding the system, or any other characteristic that may affect the transmission and/or reception of the data packet. These characteristics may be associated with the fault and stored for use in anticipating future faults based on, for example, identifying the presence of these characteristics. As such, SILoS module 100 is configured to provide assorted performance characteristics to a dedicated data store or storage device (e.g., main memory 565 and/or secondary memory 570 of FIG. 5) and coupled CPU (e.g., the processor 560 of FIG. 5) for performance an anomaly analysis. Alterations in performance can be used to evaluate system state of health of the analyzed system.

In some embodiments, the SILoS module 100 may comprise one or more packet protocol converter and/or translator (not shown) added along either pathway. The packet protocol converter and/or translator may be configured to convert a received data packet (e.g., either a block data packet or a SILoS data packet) from a first format or protocol into a second format or protocol. In some embodiments, the SILoS module 100 may be configured to convert the format of a received data packet into a common format to facilitate comparison and/or evaluation of the contents of the received data packet. Once completed, the SILoS module 100 may be configured to covert the format from the common format to the initially received format and transmit the packet to the intended recipient. This may beneficially provide a capability to receive and analysis data packets of any formats and/or protocols to ensure safe operation through ease of integration and application with any existing system.

In one embodiment, the SILoS module 100 may be included at one or more interconnects throughout a mesh network, crossbar network, or the like or similarly at interconnections along point-to-point communication channel(s) for communicatively coupling a first IP block and a second IP block for transmission of data there between. While the following description is made in reference to a point-to-point communication channel, it will be appreciated that the SILoS module 100 may be included along a multi-point communication channel, for example but not limited to, a mesh network, crossbar network, etc. The decoder 105 of the SILoS module 100 may be configured to receive a data packet from the first IP block, the data packet comprising a payload intended for the second IP block. The SILoS module 100 may also comprise digital logic circuits (e.g. logic blocks 110-140) configured to generate a digital signature from and to be associated with the data packet. The digital circuit may also build a SILoS data packet comprising the digital signature as its payload. The SILoS module 100 may be configured to transmit the SILoS data packet through the transmit path and a transmitter. In some embodiments, another SILoS module that may be substantially similar to the SILoS module 100 and may comprise a decoder configured to receive the SILoS data packet from the first SILoS module 100. The decoder of the other SILoS module may be configured to decode the digital signature from the payload of the SILoS data packet. The other SILoS module my also comprise its own digital circuit configured to evaluate the digital signature against a register of digital signatures to determine if the first digital signature has been correctly received and associate a status of the first data packet received by the second IP block from the first IP block based on the determination of the digital signature. In some embodiments, the SILoS module 100 may function as both the first and the other SILoS module.

In some embodiments, the digital signature may be generated in part based on one or more of the contents of the payload, the size of the payload, and/or other characteristics of the received data packet. In some embodiments, the second digital circuit may be configured to set the status of the data packet received at the second IP block as normal when the digital signature is correct. In some embodiments, the second digital circuit may be configured to set the status of the data packet received at the second IP block as in error when the first digital signature is incorrect. In this case, the second digital circuit may generate an error flag comprising an identification that the first data packet is in error at the second IP block. The status of the first data packet may be determined by the other SILoS module at least one of (i) at approximately the same time as the second IP block receives the first data packet and (ii) prior to the second IP block receiving the first data packet.

In some embodiments, the status of the first data packet may be stored in association with the data packet. A plurality of status may be stored in association with each of a corresponding plurality of data packets communicated throughout the system (e.g., system 200) and corresponding characteristics that are communicated from between the first and second IP blocks and monitored by the first and SILoS modules. By leveraging the stored associations and faults, the SILoS system including the one or more SILoS modules may be configured to adaptively and predictably anticipate faults (e.g., perform system prognostics) based on determining the characteristics of data packets prior before a fault occurs at one or more of the IP blocks.

In some embodiments, the second decoder may be configured to receive a data packet from the second IP block. The second data packet may comprise a second payload intended for the first IP block, and the second digital logic circuit may be further configured to generate a second digital signature associated with the second data packet and build a corresponding second SILoS data packet that includes the second digital signature as a payload of the second SILoS data packet. In some embodiments, the first decoder may also be configured to receive the second SILoS data packet from the other SILoS module and configured to decode the second digital signature from the payload of the second SILoS data packet. The first digital circuit may be configured to evaluate the second digital signature against the register of digital signatures to determine if the second digital signature is correctly received and associate a status of the second data packet received by the first IP block from the second IP block based on the determination of the second digital signature.

In some embodiments, the SILoS module 100 may be a master SILoS module and the other SILoS module may be a slave SILoS module. Furthermore, the first data packet may be a master data packet comprising a master payload including a command and the second data packet may be a slave data packet comprising a slave payload including a response to the command.

Figure 3:
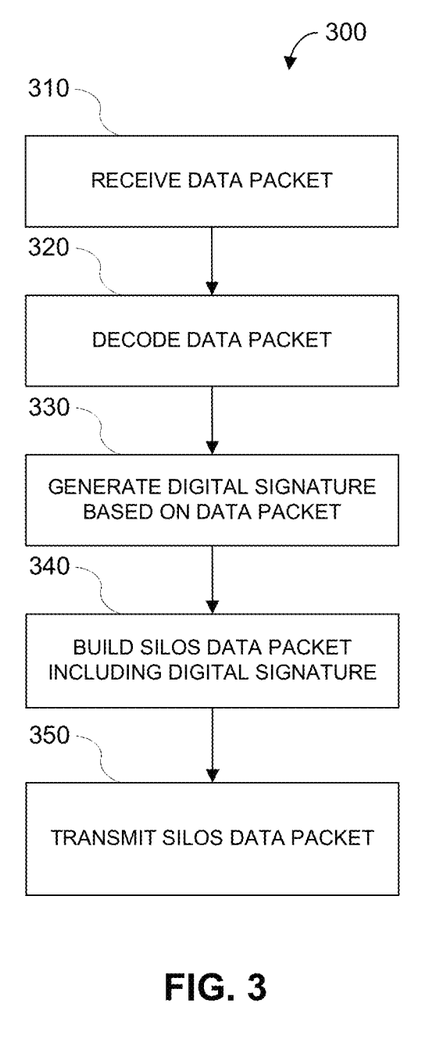
FIG. 3 is a flowchart illustrating a process for monitoring communications between data sources according to various embodiments.
Figure 4:
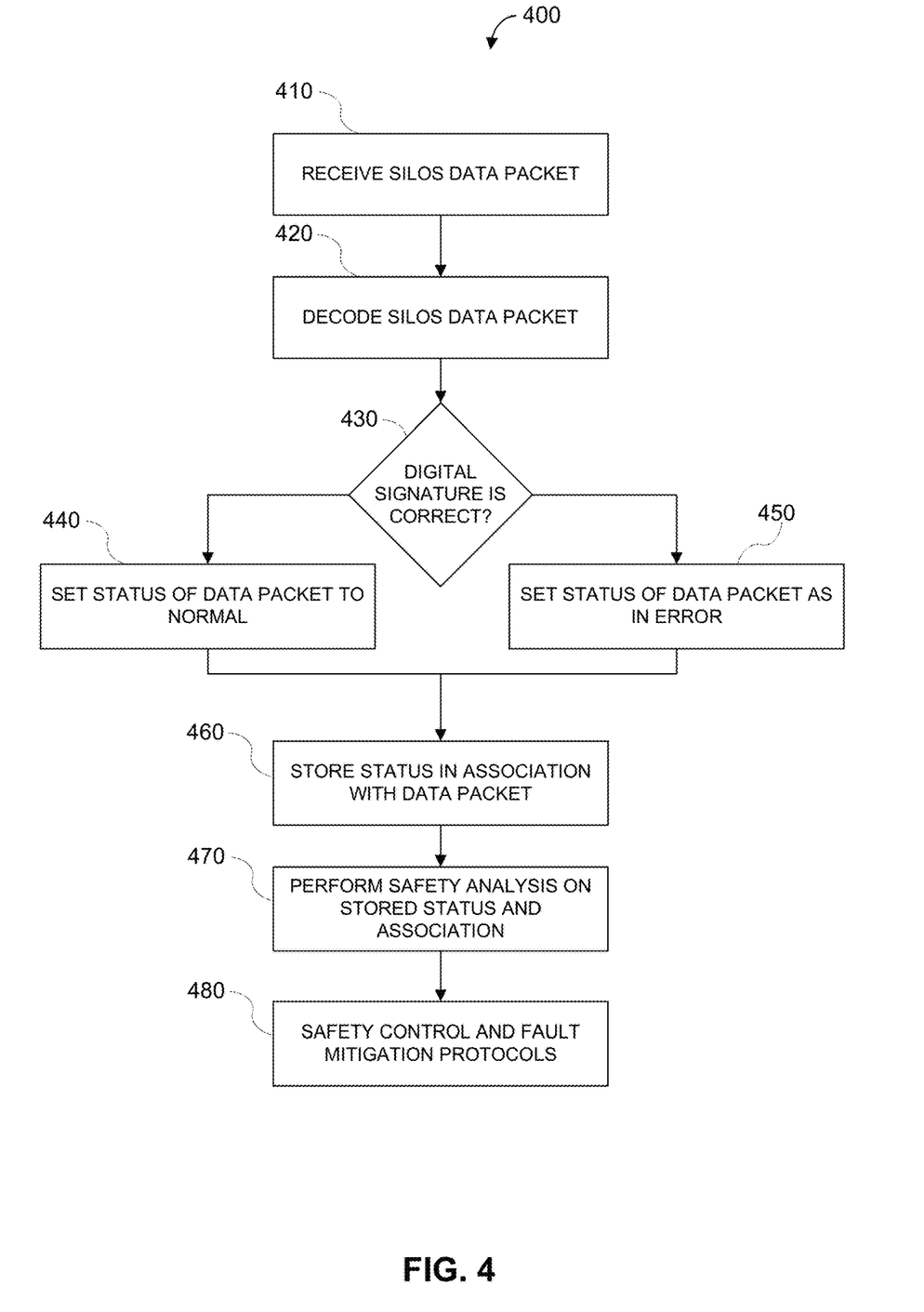
FIG. 4 is a flowchart illustrating a process for monitoring communications between data sources according to various embodiments.

FIGS. 3 and 4 are flowcharts illustrating example processes 300 and 400, respectively, for monitoring communications between data sources according to various embodiments. The process 300 and 400 may be implemented using the systems and devices described herein, for example, the SILoS 100 and/or system 200. Additional example processes are described in greater detail in Attachment 4.

At step 310, a data packet is received. In some embodiments, the data packet is received by a decoder of a SILoS module through a point-to-point communication channel between two IP blocks or at an interconnect of a mesh network, crossbar network, or the like. The data packet may be transmitted by a first IP block intended for a second IP block. The decoder may then decode the data packet (320) to identify a payload of the data packet. The payload may include a command, request, response, data, etc.

At step 330, a digital signature is generated based on the received data packet. For example, a digital logic circuit may utilize the payload of the data packet to confirm that data packet was correctly received at the SILoS module and/or correctly intended for the second IP block. If the data packet is correct, then a digital signature may be generated. In some embodiments, the digital signature may be unique to the receiving IP block, receiving SILoS module, data packet, source IP block and/or source SILoS module. Once the digital circuit is generated, a SILoS data packet (sometimes referred to as a controller data packet) may be built including the digital signature as part of the payload (340). This SILoS data packet may then be transmitted, for example, to another logic block of the SILoS module and/or to another SILoS module.

In some embodiments, the SILoS data packet may be received (410). The SILoS data packet may be decoded to identify and/or extract the digital signature included therein (420). The digital signature may then be evaluated to confirm that it is correct (430). For example, a digital logic of a SILoS module may be communicatively coupled to a data store comprising expected digital signatures, which may be compared against the extracted digital signature to confirm accuracy. If the digital signature is correct (440) a status of "normal" may be associated with the data packet from which the digital signature was derived (440). The status may be transmitted as another SILoS data packet to the receiving IP block and stored in association with the corresponding IP block (460). If the digital signature is not correct (450), the status is set to "fault" or "in error," which is stored is transmitted to the corresponding IP block and stored in association with the corresponding data packet. Storage of the status and association may be at the SILoS module, IP block, or other memory of the SOC. Data safety analysis may be performed on the status and associations to determine performance, diagnostic, and prognostic (470). The analysis may be executed by a processor (e.g., of the SILoS module, IP block, or other processor) under instructions stored in the data store for analyzing data from block 460. Based on the analysis in block 470, the processor may execute instructions to perform safety control and fault mitigation protocols (480), for example but not limited to, mitigation protocols to operate the system in a safe state, operational mode instantiate flags protocols, and safety control protocols.

Figure 5:
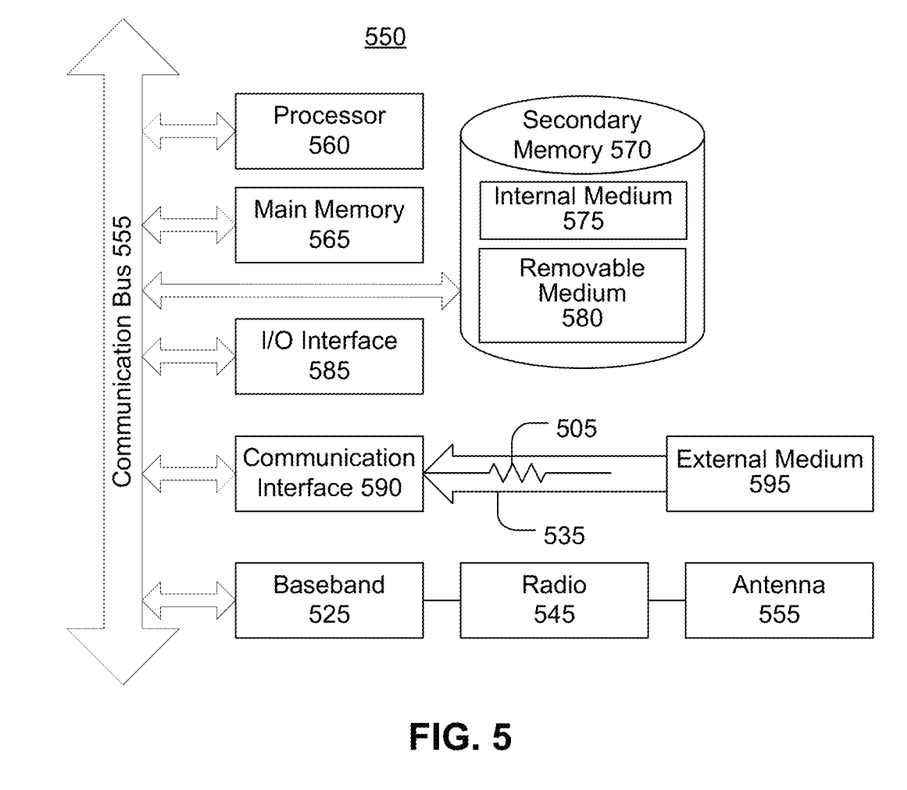
FIG. 5 is a block diagram illustrating a wired or wireless system according to various embodiments.

FIG. 5 is a block diagram illustrating a wired or wireless system 550 according to various embodiments. Referring to FIGS. 1-4 and the additional processes and embodiments described in Attachments 1-4, the system 550 may be used to perform the process 300. In some embodiments, the system 500 may be an example of the systems 200A-200D of FIGS. 1A-D into which embodiments of the SILoS system 100 may be integrated. In other embodiments, the SILoS system 100 may include or be part of the system 550, for example, a stand-alone embodiment as described herein. In various embodiments, the system 550 may be and/or be part of a conventional personal computer, computer server, personal digital assistant, smart phone, tablet computer, or any other processor enabled device that is capable of wired or wireless data communication. A person having ordinary skill in the art can appreciate that other computer systems and/or architectures may be used without departing from the scope of the present inventive concept.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPM"), IEEE 696/S-100, and the like.

The system 550 preferably includes a main memory 565 and may also include a secondary memory 570. The main memory 565 provides storage of instructions and data for programs executing on the processor 560. The main memory 565 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 570 may optionally include an internal memory 575 and/or a removable medium 580, for example a floppy disk drive, a magnetic tape drive, a compact disc ("CD") drive, a digital versatile disc ("DVD") drive, etc. The removable medium 580 is read from and/or written to in a well-known manner. Removable medium 580 may be, for example, a floppy disk, magnetic tape, CD, DVD, SD card, etc.

The removable medium 580 is a non-transitory computer readable medium having stored thereon computer executable code (i.e., software) and/or data. The computer software or data stored on the removable medium 580 is read into the system 550 for execution by the processor 560.

In alternative embodiments, secondary memory 570 may include other similar means for allowing computer programs or other data or instructions to be loaded into the system 550. Such means may include, for example, an external medium 595 and a communication interface 590. Examples of external medium 595 may include an external hard disk drive or an external optical drive, or and external magneto-optical drive.

Other examples of secondary memory 570 may include semiconductor-based memory such as programmable read-only memory ("PROM"), erasable programmable read-only memory ("EPROM"), electrically erasable read-only memory ("EEPROM"), or flash memory (block oriented memory similar to EEPROM). The removable medium 580 and the communication interface 590 allow software and data to be transferred from the external medium 595 to the system 550.

The system 550 may also include an input/output ("I/O") interface 585. The I/O interface 585 facilitates input from and output to external devices. For example the I/O interface 585 may receive input from a keyboard or mouse and may provide output to a display. The I/O interface 585 is capable of facilitating input from and output to various alternative types of human interface and machine interface devices alike.

The communication interface 590 allows software and data to be transferred between system 550 and external devices (e.g. printers), networks, or information sources. For example, computer software or executable code may be transferred to system 550 from a network server via communication interface 590. Examples of communication interface 590 include, for example, but not limited to, a modem, a network interface card ("NIC"), a wireless data card, a communications port, a PCMCIA slot and card, an infrared interface, and an IEEE 1394 fire-wire.

The communication interface 590 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via the communication interface 590 are generally in the form of electrical communication signals 505. In one exemplary embodiment, these electrical communication signals 505 are provided to the communication interface 590 via a communication channel 535. In one embodiment, the communication channel 535 may be a wired or wireless network, or any variety of other communication links. The communication channel 535 carries the electrical communication signals 505 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include the main memory 565, the secondary memory 570 (including the internal memory 575, the removable medium 580, and the external medium 595), and any peripheral device communicatively coupled with the communication interface 590 (including a network information server or other network device). These non-transitory computer readable mediums are means for providing executable code, programming instructions, and software to the system 550.

In one embodiment implemented using software, the software may be stored on a computer readable medium and loaded into the system 550 by way of the removable medium 580, the I/O interface 585, or the communication interface 590. In such an embodiment, the software is loaded into the system 550 in the form of electrical communication signals 505. The software, when executed by the processor 560, preferably causes the processor 560 to perform the inventive features and functions previously described herein.

The system 550 also includes optional wireless communication components that facilitate wireless communication over a voice and over a data network. The wireless communication components comprise an antenna system 555, a radio system 545 and a baseband system 525. In the system 550, radio frequency ("RF") signals are transmitted and received over the air by the antenna system 555 under the management of the radio system 545.

In one embodiment, the antenna system 555 may comprise one or more antennae and one or more multiplexors (not shown) that perform a switching function to provide the antenna system 555 with transmit and receive signal paths. In the receive path, received RF signals can be coupled from a multiplexor to a low noise amplifier (not shown) that amplifies the received RF signal and sends the amplified signal to the radio system 545.

In alternative embodiments, the radio system 545 may comprise one or more radios that are configured to communicate over various frequencies. In one embodiment, the radio system 545 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 545 to the baseband system 525.

If the received signal contains audio information, then baseband system 525 decodes the signal and converts it to an analog signal. Then the signal is amplified and sent to a speaker. The baseband system 525 may also receive analog audio signals from a microphone. These analog audio signals are converted to digital signals and encoded by the baseband system 525. The baseband system 525 also codes the digital signals for transmission and generates a baseband transmit audio signal that is routed to the modulator portion of the radio system 545. The modulator mixes the baseband transmit audio signal with an RF carrier signal generating an RF transmit signal that is routed to the antenna system 555 and may pass through a power amplifier (not shown). The power amplifier amplifies the RF transmit signal and routes it to the antenna system 555 where the signal is switched to the antenna port for transmission.

The baseband system 525 may also be communicatively coupled with the processor 560. The processor 560 has access to main memory 565 and/or secondary memory 570. The processor 560 is preferably configured to execute instructions (i.e., computer programs or software) that can be stored in the main memory 565 or the secondary memory 570. Computer programs can also be received from the baseband system 525 and stored in the main memory 565 or in secondary memory 570, or executed upon receipt. Such computer programs, when executed, enable the system 550 to perform the various functions of the present invention as previously described. For example, the main memory 565 may include various software modules (not shown) that are executable by processor 560.

The accompanying claims and their equivalents are intended to cover such forms or modifications as would fall within the scope and spirit of the protection. For example, the example apparatuses, methods, and systems disclosed herein can be applied wireless communication devices incorporating HF and/or UHF RFID reader capabilities. The various components illustrated in the figures may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A system integrity level of service (SILoS) system for monitoring communications between intellectual property (IP) blocks, the system comprising:
   a communication channel communicatively coupled between a first intellectual property block and a second intellectual property block for transmission of data between the first and second intellectual property blocks;
   a first controller communicatively coupled between the first intellectual property block and the communication channel, the first controller comprising:
      a first decoder configured to receive a first data packet from the first IP block, the first data packet comprising a first payload for the second IP block,
      a first digital logic circuit configured to generate a first digital signature associated with the first data packet and build a first controller data packet comprising the first digital signature as a payload of the first controller data packet, and
      a first transmitter configured to transmit the first controller data packet; and
   a second controller communicatively coupled between the second intellectual property block and the communication channel, the second controller comprising:
      a second decoder configured to receive the first controller data packet from the first controller and configured to decode the first digital signature from the payload of the first controller data packet; and
      a second digital circuit configured to evaluate the first digital signature against a register of digital signatures to determine if the first digital signature is correctly received and associate a status of the first data packet received by the second IP block from the first IP block based on the determination of the first digital signature,
   wherein the first controller is configured to receive a plurality data packets comprising the first data packet and assure the correct sequencing of received data packets, and transmit the sequencing and data packets to a dedicated data storage device.

2. The SILoS system of claim 1, wherein the second digital circuit is configured to set the status of the first data packet at the second IP block as normal when the first digital signature is correct.

3. The SILoS system of claim 1, wherein the second digital circuit is configured to set the status of the first data packet at the second IP block as in error when the first digital signature is incorrect.

4. The SILoS system of claim 3, wherein the second digital circuit is configured to generate an error flag comprising an identification that the first data packet is in error at the second IP block.

5. The SILoS system of claim 1, wherein the status of the first data packet is determined by the second controller at least one of (i) at approximately the same time as the second IP block receives the first data packet and (ii) prior to the second IP block receiving the first data packet.

6. The SILoS system of claim 1, wherein the second decoder is further configured to receive a second data packet from the second IP block, the second data packet comprising a second payload for the first IP block, and the second digital logic circuit is further configured to generate a second digital signature associated with the second data packet and build a second controller data packet comprising the second digital signature as a payload of the second controller data packet, the second controller comprising a second transmitter configured to transmit the second data packet.

7. The SILoS system of claim 6, wherein the first decoder is further configured to receive the second controller data packet from the second controller and configured to decode the second digital signature from the payload of the second data packet, the first digital circuit further configured to evaluate the second digital signature against the register of digital signatures to determine if the second digital signature is correctly received and associate a status of the second data packet received by the first IP block from the second IP block based on the determination of the second digital signature.

8. The SILoS system of claim 7, wherein the first controller is a master controller and the second controller is a slave controller, wherein the first data packet is a master data packet comprising a master payload including a command and the second data packet is a slave data packet comprising a slave payload including a response to the command.

9. The SILoS system of claim 1, wherein the first controller is coupled to a PSA comparison logic and a PSA register file, and wherein the sequencing and data packets are transmitted to the dedicated data storage device for diagnostic and prognostic analysis by a computer comprising memory storing performance analysis software that is executed by a processor.

10. The SILoS system of claim 1, wherein one or more of the first controller and the second controller are implemented as one or mom of hardware, a processor configured to execute software stored on a memory, and a processor configured to execute firmware stored on a memory.

11. A system integrity level of service (SILoS) system for monitoring communications between intellectual property (IP) blocks, the system comprising:
   a communication channel communicatively coupled between a first intellectual property block and a second intellectual property block for transmission of data between the first and second intellectual property blocks, a first controller communicatively coupled between the first intellectual property block and the communication channel, the first controller comprising:
  a first decoder configured to receive a first data packet from the first IP block, the first data packet comprising a first payload for the second IP block,
  a first digital logic circuit configured to generate a first digital signature associated with the first data packet and build a first controller data packet comprising the first digital signature as a payload of the first controller data packet, and
  a first transmitter configured to transmit the first controller data packet; and
a second controller communicatively coupled between the second intellectual property block and the communication channel, the second controller comprising:
  a second decoder configured to receive the first controller data packet from the first controller and configured to decode the first digital signature from the payload of the first controller data packet; and
  a second digital circuit configured to evaluate the first digital signature against a register of digital signatures to determine if the first digital signature is correctly received and associate a status of the first data packet received by the second IP block from the first IP block based on the determination of the first digital signature,
wherein the status of the first data packet is stored in association with the first data packet, wherein a plurality of status are stored in association with each of a corresponding plurality of data packets that are communicated from between the first and second IP blocks and monitored by the first and second controllers.

\* \* \* \* \*